United States Patent
D'Amore et al.

(10) Patent No.: US 8,307,959 B2
(45) Date of Patent: Nov. 13, 2012

(54) ELECTRICALLY-OPERATED SHAFT BRAKE WITH MANUAL POSITIVE LOCK AND ROTARY RELEASE AND AUTOMATIC RESET FEATURE

(75) Inventors: Marco D. D'Amore, Buffalo, NY (US); Patrick K. Griffin, Cowlesville, NY (US)

(73) Assignee: Moog Inc., East Aurora, NY (US)

( * ) Notice: Subject to any disclaimer, the term of this patent is extended or adjusted under 35 U.S.C. 154(b) by 775 days.

(21) Appl. No.: 12/448,630

(22) PCT Filed: Jun. 12, 2007

(86) PCT No.: PCT/US2007/013722
§ 371 (c)(1),
(2), (4) Date: Jun. 26, 2009

(87) PCT Pub. No.: WO2008/153519
PCT Pub. Date: Dec. 18, 2008

(65) Prior Publication Data
US 2010/0038193 A1 Feb. 18, 2010

(51) Int. Cl.
*F16D 65/28* (2006.01)
*B60W 10/10* (2012.01)

(52) U.S. Cl. .................. 188/156; 188/69; 188/265

(58) Field of Classification Search .......... 188/67, 188/69, 156, 161, 164, 265; 192/222, 226
See application file for complete search history.

(56) References Cited

U.S. PATENT DOCUMENTS

| | | | | |
|---|---|---|---|---|
| 2,516,208 A | * | 7/1950 | Hasbany | 477/126 |
| 3,174,596 A | * | 3/1965 | Sisson | 192/223.3 |
| 3,329,248 A | * | 7/1967 | Schubert | 192/84.7 |
| 3,572,641 A | * | 3/1971 | Peterson et al. | 366/128 |
| 4,534,454 A | * | 8/1985 | Brooks | 192/18 A |
| 5,782,328 A | * | 7/1998 | Fogelberg et al. | 192/35 |

* cited by examiner

*Primary Examiner* — Melody Burch
(74) *Attorney, Agent, or Firm* — Phillips Lytle LLP

(57) ABSTRACT

A device (20) has an electrically-operated brake (37) and a manually-operated auxiliary brake (27). The electrically-operated brake includes a coil (70), a core (68), an armature (69), and an alternating series of friction pads (74) and brake disks (75), that are arranged to be compressed between the housing and the armature. The shaft brake (27) includes a collar (22) mounted on the housing for combined axial and rotative movement relative thereto, a first interlock portion (106, 110) mounted on the shaft (24), an annular member (84) surrounding the shaft and having a second interlock portion (85) and a spring (124) urging the member to move toward the shaft. The collar (22) is adapted to be selectively moved relative to the housing between a first portion at which the first (106, 110) and second (85) interlock portions are physically engaged with one another, and a second position at which the first (106, 110) and second (85) interlock portions are physically separated from one another. The shaft (24) may include a first and second shaft portions (25, 26), and a cam mechanism (125, 126) that automatically releases the braking mechanism when the shaft portions (25, 26) are rotated relative to one another, and that automatically re-engages the braking mechanism when the two shaft portions (25, 26) are moved back to their initial null position.

14 Claims, 7 Drawing Sheets

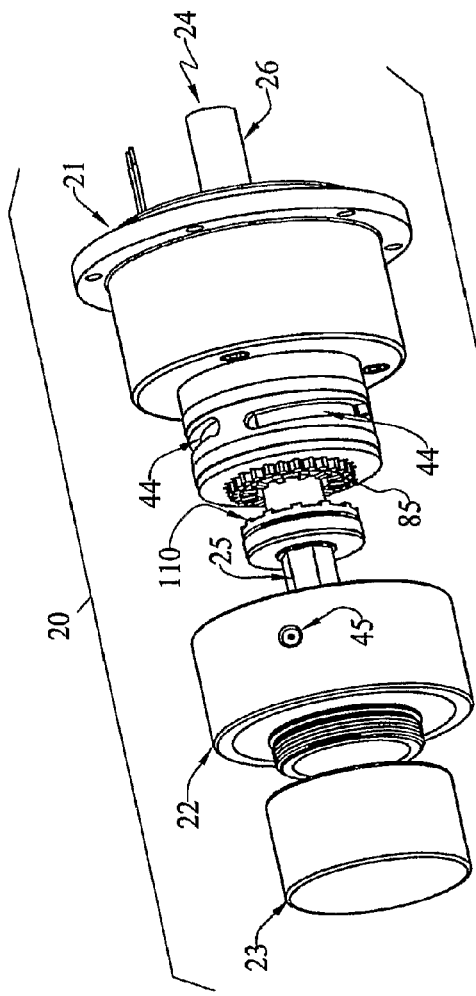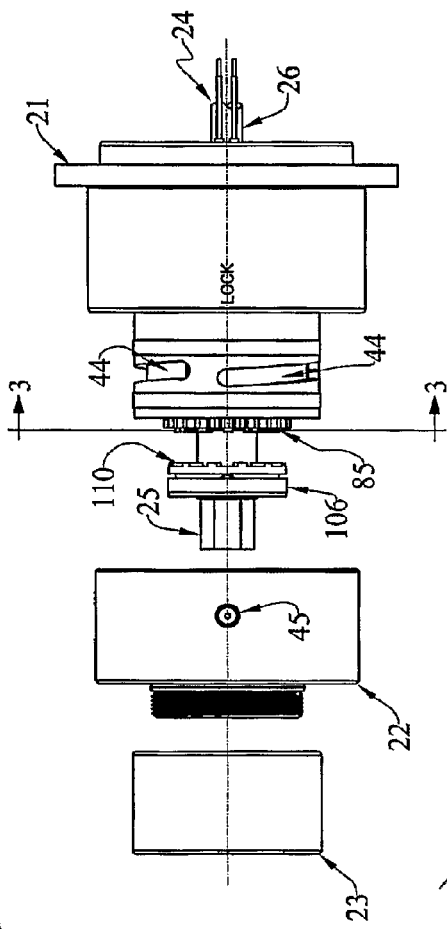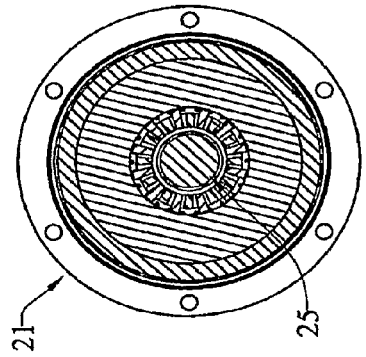

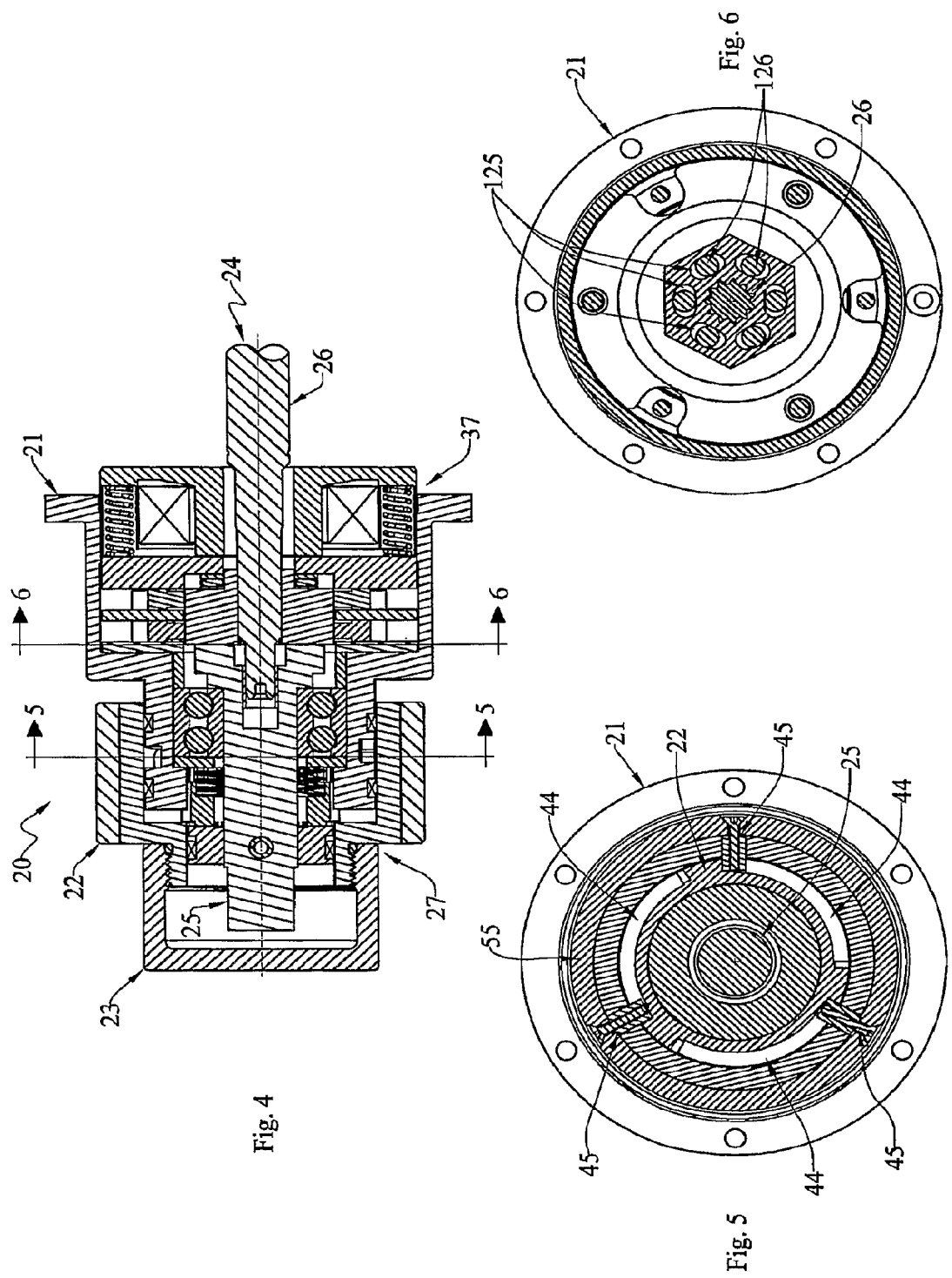

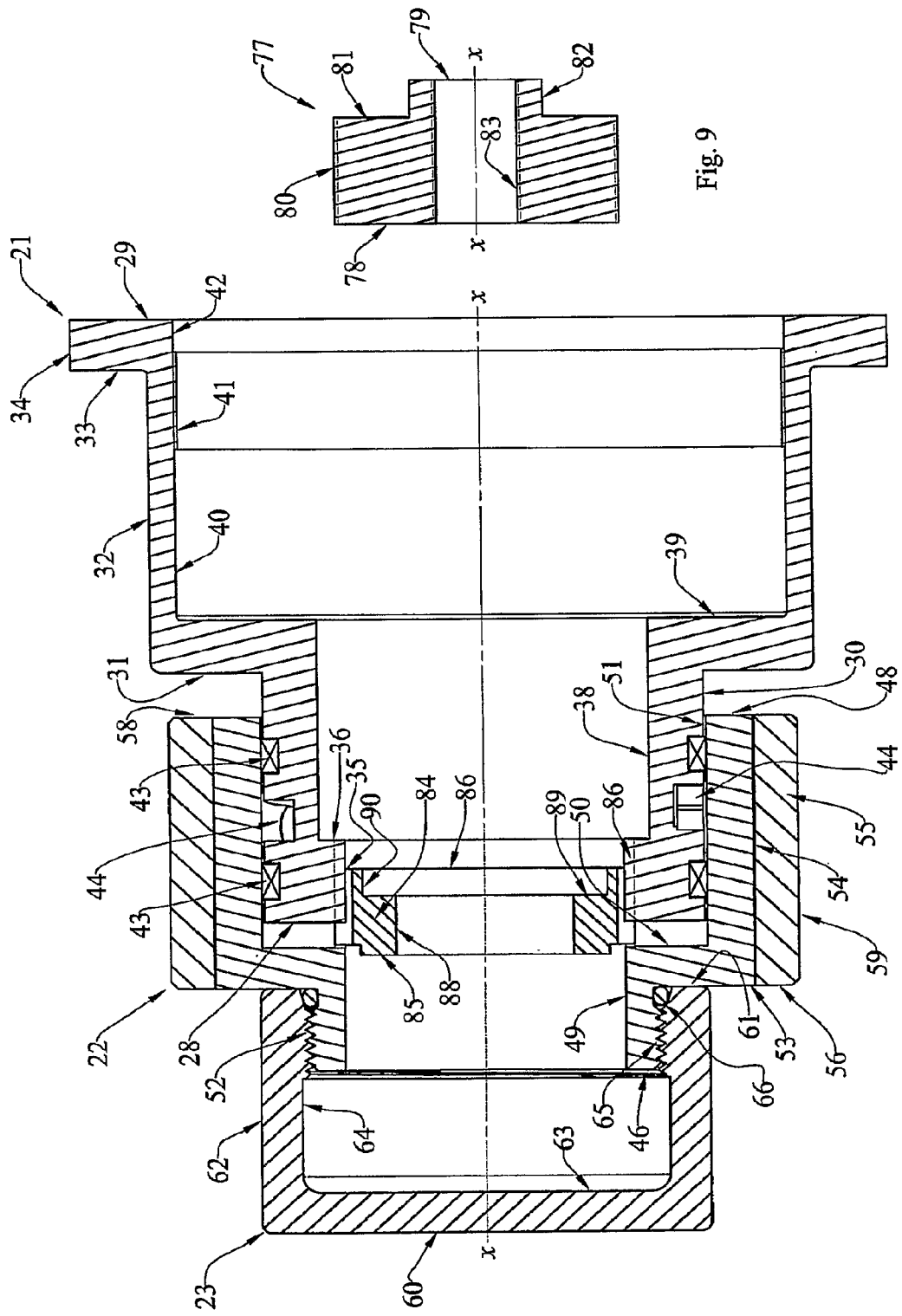

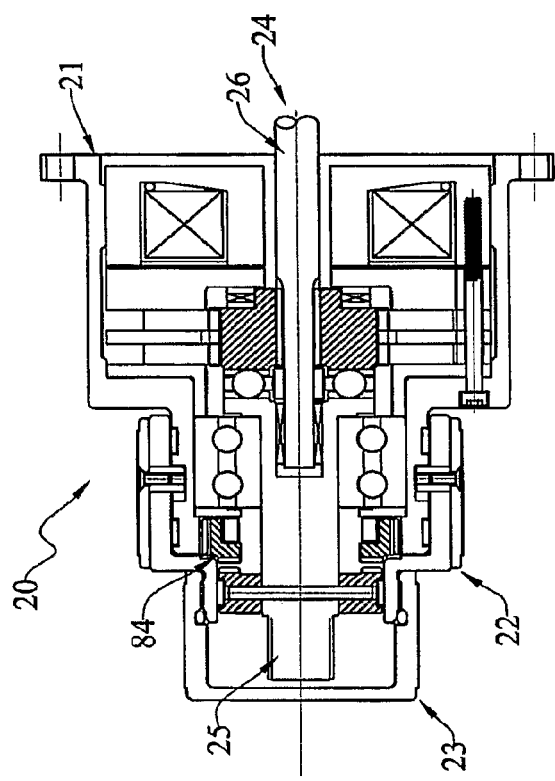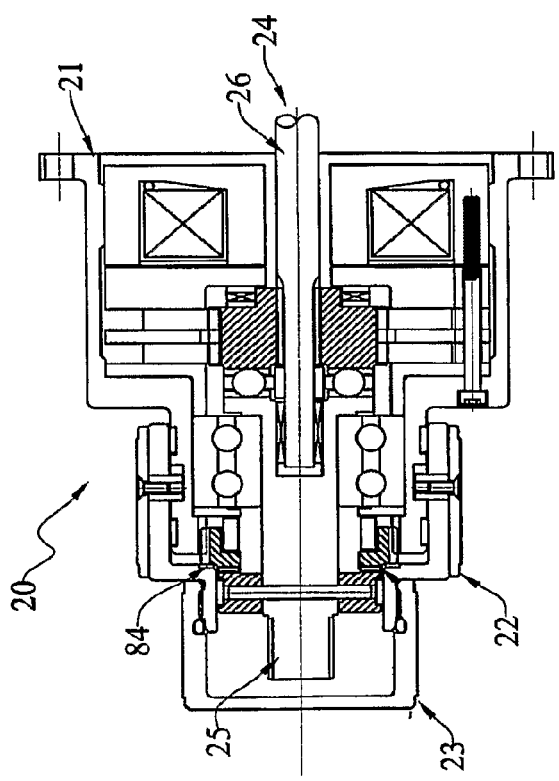
Fig. 13 (UNLOCKED)
Fig. 14 (LOCKED)

ELECTRICALLY-OPERATED SHAFT BRAKE WITH MANUAL POSITIVE LOCK AND ROTARY RELEASE AND AUTOMATIC RESET FEATURE

TECHNICAL FIELD

The present invention relates generally to machinery having a rotating shaft, and, more particularly, to an improved electrically-operated shaft brake with a manually-operable positive lock and a rotary release and automatic reset feature, for use with such machinery.

BACKGROUND ART

It is sometimes necessary to provide a brake for a shaft.

In some cases, it is desirable to operate the brake electrically. To this end, electrically-operated brakes have been provided. These have generally included a housing or body, a coil mounted thereon, and an armature that is selectively movable when the coil is energized. A resilient member, such as a spring, biases the armature to move away from the coil. An alternating series of friction pads and brake disks are operatively arranged between the armature and the housing, and are arranged to be compressed when the coil is de-energized. One of the pads and disks are connected to the rotating shaft, and the other of the pads and disks are connected to the housing. Hence, when the coil is de-energized, the spring urges the armature to compress the friction brake, and to brake the shaft. In some cases, it is necessary to manually rotate the shaft, or to drive the shaft without power.

In some instances, it would be highly desirable to provide an auxiliary brake that would positively lock the shaft to the housing. Such an auxiliary brake should be effective even if the shaft and housing experience substantial vibration. There is also a need for the shaft to lock automatically to prevent failure or machine damage when the shaft is no longer rotated without power. Accordingly, there is believed to have been a long-felt need for an electrically-operated shaft brake with a manually-operated positive lock and with a rotary release and automatic reset feature.

DISCLOSURE OF THE INVENTION

With parenthetical reference to the corresponding parts, portions or surfaces of the disclosed embodiment, merely for purposes of illustration and not by way of limitation, the present invention broadly provides an improvement in a device (20) having a portion of a shaft (24) mounted for rotation within a housing (21).

The improvement broadly comprises: a shaft brake (27) adapted to be selectively engaged to prevent rotation of the shaft relative to the housing and adapted to be selectively disengaged to permit rotation of the shaft relative to the housing, the brake including: a collar (22) mounted on the housing for combined axial and rotative movement relative thereto; a first interlock portion (110) mounted on the shaft; an annular member (84) surrounding the shaft and mounted on the housing for axial but not rotative movement relative thereto, the member having a second interlock portion (85) arranged to face toward the first interlock portion; a spring (124) acting between the member and the shaft and urging the second interlock portion to move toward the first interlock portion; and wherein the collar is adapted to be selectively moved relative to the housing between a first position (as shown in FIG. 14) at which the first and second interlock portions are interlocked with one another to prevent rotation of the shaft relative to the housing, and a second position (as shown in FIG. 13) at which the first and second interlock portions are physically separated from one another to permit the shaft to rotate relative to the housing.

The first and second interlock portions may be face spline portions, or some other type of mechanical interlock.

The collar may be mounted on the housing by a helical connection. The collar may be adapted to be grasped and manually moved relative to the housing to selectively lock and unlock the auxiliary brake.

The member (84) may be adapted to be mounted on the housing by one of a keyed and spline connection.

The spring (124) may be a wave spring, a Belleville spring stack, or the like.

The device may also include an electrically-operated brake (37) adapted to be selectively operated to permit and prevent relative rotation between the shaft and the housing. The housing may have a first abutment surface (47) and an opposed second abutment surface (72). The electrically-operated brake may include: a coil (70) mounted on the housing; an armature (69) mounted on the housing for movement toward and away from the housing first abutment surface; a resilient member (73) acting between the housing and the armature and urging the armature to move away from the housing first abutment surface; an annular hub (77) surrounding the first shaft and mounted on the housing for axial but not rotative movement relative thereto; and an alternating series of friction pads (74) and brake disks (75) positioned between the armature and the housing second abutment surface, one of the pads and disks being fixed to the hub for movement therewith and the other of the pads and disks being connected to the housing such that when the coil is energized, the armature will be moved toward the housing first abutment surface to permit relative rotation between the shaft and housing, and when the coil is de-energized the resilient member will expand to cause the alternating series of friction pads and brake disks to be compressed between the armature and the housing second abutment surface.

The shaft (24) may include a first portion (25) and a second portion (26). The first interlock portion (110) may be mounted on the shaft first portion, and the hub (77) may surround the shaft second portion.

The device may further include a plurality of cams (125) and followers (126) acting between the first and second shaft portions to permit some relative rotation therebetween. When the coil is de-energized, and the shaft portions are moved relative to one another, the follower moves along the cam to reduce the compressive force exerted by the resilient member (73) on the alternating series of friction pads and disks. This allows the friction pads and disks to automatically re-engage when the two shaft portions are returned to their relative angular null position. In the preferred form, a marginal end portion of the first shaft has a hexagonal outline and is adapted to be manually rotated relative to the housing when the coil is de-energized.

Accordingly, the general object of the invention is to provide an electromagnetic brake having a manual shaft brake interlock.

Another object is to provide an improved shaft brake.

These and other objects and advantages will become apparent from the foregoing and ongoing written specification, the drawings, and the appended claims.

BRIEF DESCRIPTION OF THE DRAWINGS

FIG. 1 is an exploded isometric view of a first form of an improved electrically-operated shaft brake that incorporates a manually-operable auxiliary brake or positive lock, according to the present invention.

FIG. 2 is a side elevation of the exploded shaft brake assembly shown in FIG. 1.

FIG. 3 is a fragmentary transverse vertical sectional view thereof, taken generally on line 3-3 of FIG. 2, showing the separated face spline portions of the auxiliary brake.

FIG. 4 is a fragmentary longitudinal vertical sectional view of the assembled device shown in FIG. 1.

FIG. 5 is a fragmentary transverse vertical sectional view thereof, taken generally on line 5-5 of FIG. 4, and principally showing the helical connection between the collar and the housing.

FIG. 6 is a fragmentary transverse vertical sectional view thereof, taken generally on line 6-6 of FIG. 4, showing the cam surfaces and follower balls that are arranged between the first and second shaft portions.

FIG. 8 is a fragmentary longitudinal vertical sectional view of the housing, the collar, the protective cover and the member, this view principally to illustrate the structure of these parts apart from the general combination.

FIG. 9 is a fragmentary longitudinal vertical sectional view of the hub.

FIG. 13 is a schematic view, partly in section and partly in outline, of the device shown in FIG. 1, and showing the connection of the apparatus when the auxiliary brake is unlocked.

FIG. 14 is a schematic view similar to FIG. 12, again partly in section and partly in outline, but showing the condition of the apparatus when the auxiliary brake is locked.

DESCRIPTION OF THE PREFERRED EMBODIMENTS

Figure 7:
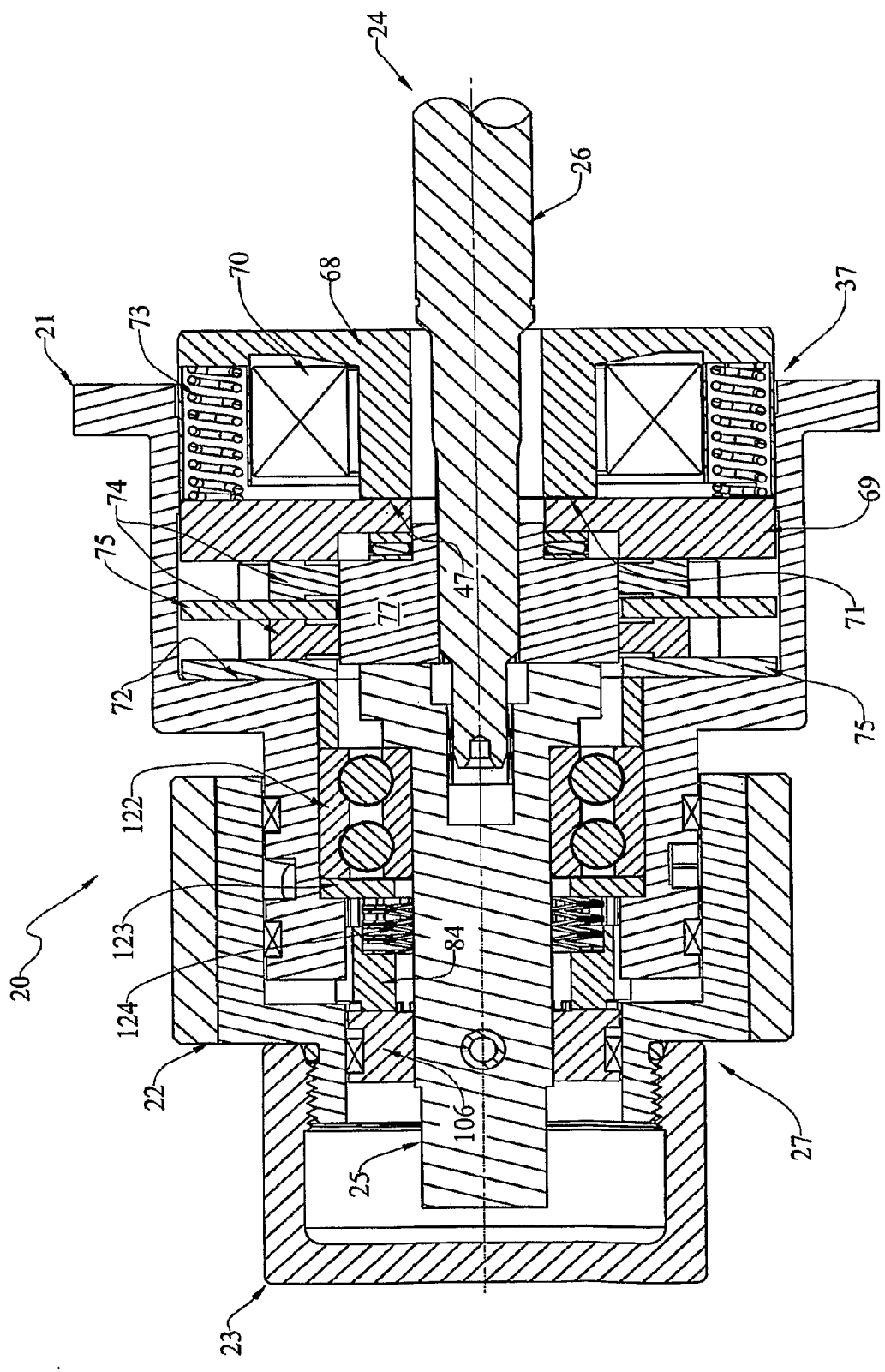
FIG. 7 is a greatly-enlarged longitudinal vertical sectional view of the assembled device shown in FIG. 4.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, the present invention broadly provides an improved electrically-operated shaft brake which incorporates a manually-operable positive lock or auxiliary brake, and a rotary release and automatic reset feature. The improved device is generally indicated at 20 in FIGS. 1, 4, 7 13 and 14, and is shown as broadly including a housing 21, a collar 22, a protective cap 23, and an two-piece shaft 24. The assembled shaft is depicted as including a leftward first portion 25 and a rightward second portion 26.

As best shown in FIG. 8, the housing is a horizontally-elongated specially-configured tubular member having an annular vertical left end face 28, an annular vertical right end face 29, and an outer surface that sequentially includes (from left to right): a horizontal cylindrical surface 30 extending rightwardly from the outer margin of left end face 28, a leftwardly-facing annular vertical surface 31, a horizontal cylindrical surface 32, a leftwardly-facing annular vertical surface 33, and a horizontal cylindrical surface 34 continuing rightwardly therefrom to join the outer margin of right end face 29. Surfaces 33, 34, 29 form an outwardly-extending annular flange that is provided with a plurality of circularly-spaced mounting holes (FIG. 5-6).

The housing includes a stepped axial through-bore, which sequentially includes (from left to right in FIG. 8): a splined surface 35 extending rightwardly from the inner margin of left end face 28, a rightwardly-facing annular vertical surface 36, a horizontal cylindrical surface 38, a rightwardly-facing annular vertical surface 39, a horizontal cylindrical surface 40, an internally-threaded portion 41, and a horizontal cylindrical surface 42 continuing rightwardly therefrom to join the inner margin of right end face 29. A pair of axially-spaced annular grooves extend radially into the housing from outer surface 30 to receive and accommodate a pair of bearings, severally indicated at 43, by means of which the collar is slidably and rotatively mounted on the housing. Between these two annular grooves, the housing is provided with three discrete circularly-spaced helical grooves, severally indicated at 44, each occupying an arc distance of about 90°. As best shown in FIG. 5, three pins 45 are mounted on the collar such that their inner marginal end portions are received in grooves 44. Each pin is shown as being surrounded by a cylindrical sleeve. As clearly shown in FIGS. 1 and 2, these grooves are helical such that when the collar is grasped and rotated relative to the housing, the collar will experience compound rotative and axial movement relative to the housing.

Adverting now to FIG. 8, the collar is also shown as being a horizontally-elongated specially-configured tubular member having an annular vertical left end face 46, an annular vertical right end face 48, and an inner surface that sequentially includes (from left to right): a horizontal cylindrical surface 49 extending rightwardly from the inner margin of left end face 46, a rightwardly-facing annular vertical surface 50, and a horizontal cylindrical surface 51 continuing rightwardly therefrom to join the inner margin of right end face 48. The outer surface of this collar includes (again from left to right): an externally-threaded portion 52 extending rightwardly from the outer margin of left end face 46, a leftwardly-facing annular vertical surface 53, and an horizontal cylindrical surface 54 continuing rightwardly therefrom to join the outer margin of right end face 48. A cylindrical member 55 may be suitably secured to surface 54. This cylindrical member 55 is shown as having an annular vertical left end face 56 which appears to be a continuation of collar left end face 53, an annular vertical right end face 58 which appears to be an extension of collar right end face 48, and a knurled outer surface 59. As previously indicated, the collar is mounted for compound axial and rotative movement relative to the housing by means of pins 45 being received in helical grooves 44.

Such relative motion between the collar and housing is accommodated by bearings 43.

Still referring principally to FIG. 8, the protective cover 23 is shown is being a cup-shaped member having a circular vertical left end face 60, an annular vertical right end face 61, an outer cylindrical surface 62 extending between the outer margins of left end face 60 and right end face 61, and an inner surface which includes a rightwardly-facing circular vertical surface 63, a horizontal cylindrical surface 64, and an internally-threaded portion 65 continuing rightwardly therefrom to join the inner marginal end of right end face 61. Protective cap threaded portion 65 is adapted to mate with housing threaded portion 52. An O-ring 66 is positioned between the right end of the protective cap and the collar.

Figure 11:
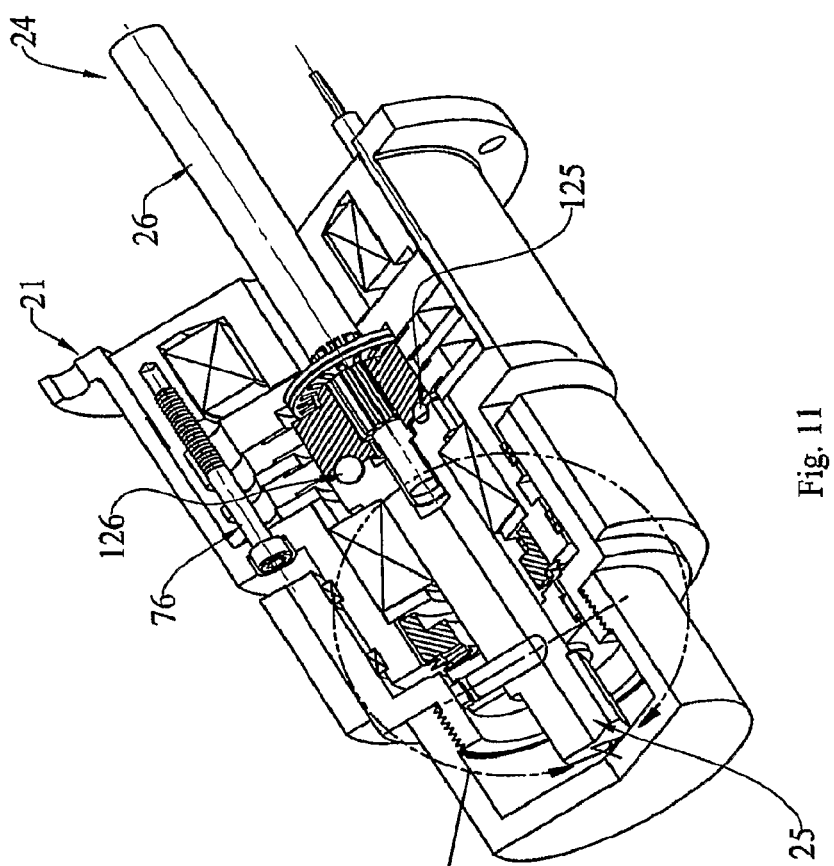
FIG. 11 is an isometric cutaway view, partly in section and partly in outline, of the assembled device, showing the spline connection between the hub and the second shaft, and showing the member carrying the face spline in relation to the second shaft with the member-biasing springs omitted.
Figure 12:
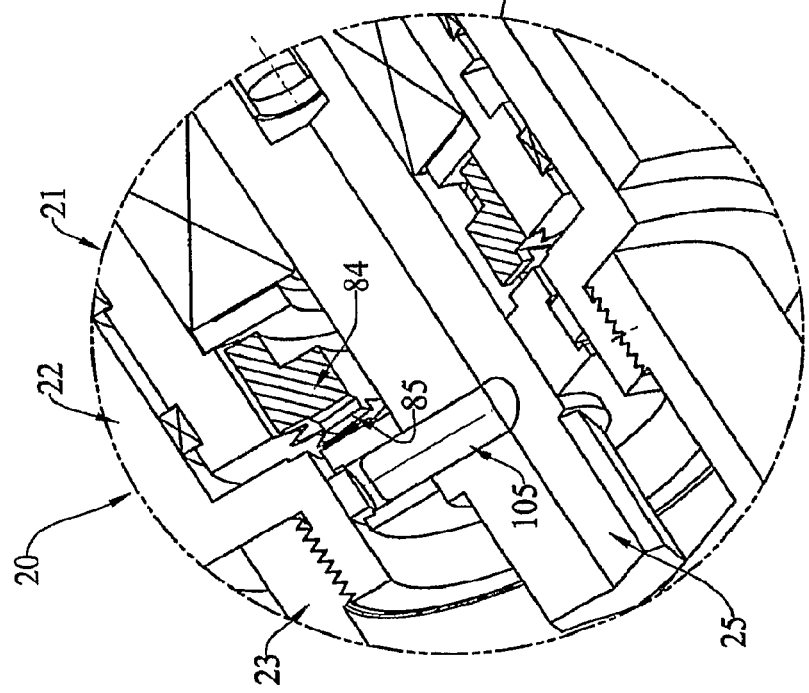
FIG. 12 is an enlarged isometric cutaway view, partly in section and partly in outline, of the structure surrounding the member, this view being taken within the indicated portion of FIG. 11.

Referring now to FIG. 7, the electrical portion of the brake includes an annular core 68 clamped into engagement with the housing, an annular plate-like armature 69, and coil 70 arranged within the core. The core has a leftwardly-facing first abutment surface 71, and the housing has a horizontally-spaced facing and opposed second abutment surface 72. A plurality of springs severally indicated at 73 act between the core and the armature and continuously urge the armature to move leftwardly relative to the assembled core and housing. A plurality of friction pads 74 and brake disks 75 are operatively arranged between the armature and housing second abutment surface 72. The friction pads 74 are coupled to a lug 77 via a spline connection. These can be coupled to the lug by a keyed or splined connection, or held on with a polygonal outer diameter. The disks are mounted on the housing via bolts 76 (FIG. 11). Thus, when the coil is de-energized, springs 73 expand to urge the armature 69 to move leftwardly relative to the housing, compressing the alternating series of friction pads and brake disks between housing second abutment surface 72 and the armature. This then exerts a braking action on the rotation of shaft 24. Alternatively, when the coil is energized, armature 69 is pulled rightwardly relative to the housing, compressing springs 73. This unloads the friction pad-and-brake assembly between the armature and the housing second abutment surface, and allows rotation of the shaft relative to the housing.

Referring now to FIG. 9, the lug 77 is depicted as being a horizontally-elongated specially configured member having an annular vertical left end face 78, an annular vertical right end face 79, an outer surface sequentially including: splined portion 80 extending rightwardly from the outer margin of left end face 78, a rightwardly-facing annular vertical surface 81, and an horizontal cylindrical surface 82 continuing rightwardly therefrom to join the outer margin of right end face 79. Lug 77 has a splined inner surface 83 which is adapted to mate with a corresponding splined portion 116 on the second shaft, as described infra. Thus, lug 77 is mounted for axial sliding movement relative to the shaft, but is coupled for rotative movement therewith.

Referring now to FIG. 8, a member 84 is slidably mounted within the left marginal end portion of the housing. This member is shown as being a horizontally-elongated specially configured member having an annular vertical left end face 85, an annular vertical right end face 86, a outer surface including a splined portion 87 extending therebetween, and a stepped axial through-bore which sequentially includes: a cylindrical surface 88 extending rightwardly from the inner margin of left end face 85, a rightwardly-facing annular vertical surface 89, and a horizontal cylindrical surface 90 continuing rightwardly therefrom to join the inner margin of right end face 86.

Figure 10:
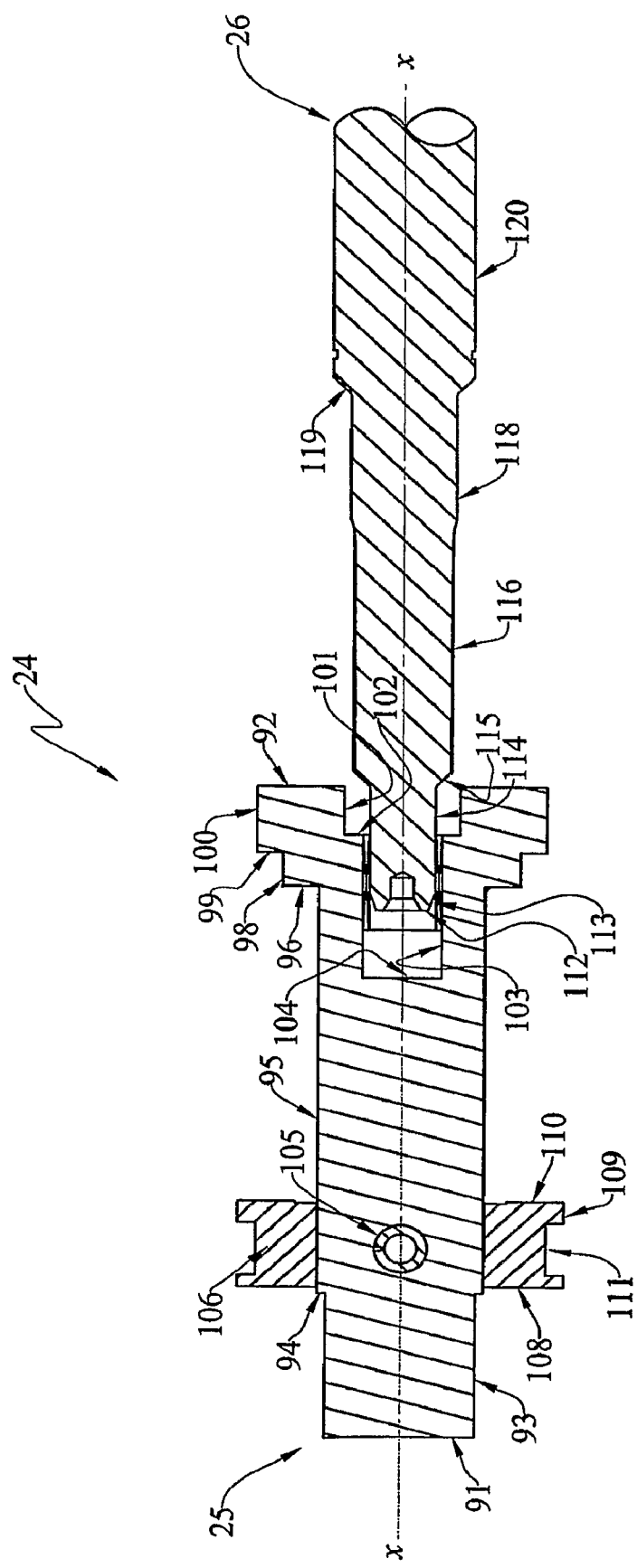
FIG. 10 is a fragmentary longitudinal vertical sectional view of the shaft, showing the two shaft portions.

Referring now to FIG. 10, the aggregate shaft 24 is depicted as having a leftward or first portion 25 and a rightward or second portion 26. These two portions aligned along axis x-x, with the left marginal end portion of the second shaft portion 26 being received in the recess extending leftwardly into the first shaft portion from its right end face.

More particularly, shaft first portion 25 is shown as being a specially-configured horizontally-elongated member having a circular vertical left end face 91, an annular vertical right end face 92, and a stepped outer surface that sequentially includes (from left to right): a horizontal cylindrical surface 93 extending rightwardly from the outer margin of left end face 91, a leftwardly-facing annular vertical surface 94, a horizontal cylindrical surface 95, a leftwardly-facing annular vertical surface 96, a horizontal cylindrical surface 98, a leftwardly-facing annular vertical surface 99, and a horizontal cylindrical surface 100 continuing rightwardly therefrom to join the outer margin of right end face 92. A stepped blind axial hole extends leftward into shaft first part 25 from its right end face 92. This hole is sequentially bounded by: a horizontal cylindrical surface 101 extending leftwardly from the inner margin of right end face 92, an annular vertical surface 102, and a horizontal cylindrical surface 103 continuing leftwardly therefrom to join a rightwardly-facing circular bottom surface 104. Shaft first portion 25 is shown as being a solid member, and is provided with a diametrical through-hole to receive and accommodate a pin 105 which may be used to secure an annular anchor member 106 to the shaft. This anchor member is shown as having an annular vertical left end face 108, an outwardly-facing horizontal cylindrical surface 109, and an annular vertical right face 110. A groove 111 extends radially into the member from its outer surface 109 to receive and accommodate a suitable bearing, as shown in FIG. 7.

Shaft second portion 26 is shown as being a horizontally-elongated solid member having an annular vertical left end face 112, and an outer surface that sequentially includes (from left to right): a leftwardly- and outwardly-facing frusto-conical surface 113, a horizontal cylindrical surface 114, a leftwardly- and outwardly-facing frusto-conical surface 115, a splined portion 116, a horizontal cylindrical surface 118, a leftwardly- and outwardly-facing frusto-conical surface 119, and a horizontal cylindrical surface 120 continuing rightwardly therefrom. The leftward marginal end portion of the shaft right part 26 is slidably received in the first shaft portion blind recess by means of a slide bearing 121.

The apparatus is assembled as shown in FIG. 7, with a bearing assembly 122 acting between the housing and shaft outer surface 95. To the left of this bearing is a washer like member 123. A wave spring (or, alternatively, a Belleville spring stack), collectively indicated at 124, is operatively arranged between washer-like member 123 and surface 89 of member 84. This wave spring is compressed, and continually urges the member 84 to move leftwardly relative toward the housing.

As best shown in FIGS. 1 and 11-14, the surface 85 of member 84, and surface 110 of anchor member 106, are both provided with cooperative interlock portions, such as portions of a face spline. As best shown in FIG. 10, the right end face 92 of the shaft first part 25 is arranged to abut the left end face 78 of lug 77. A plurality of cam recesses, such as indicated at 125 in FIG. 6 are circularly arranged about the axis of the shaft. Recesses 125 are preferably provided in both the first shaft and the key and receive and accommodate a plurality of balls, severally indicated at 126, therebetween. These cams and balls permit some relative movement between the shafts. However, when this relative rotation occurs, the balls ride up their respective cams, and displace lug 77 rightwardly, thereby unloading the compressed friction disk stack.

Therefore, the present invention broadly provides an improvement in a device (20) having a portion of a shaft (24) mounted for rotation within a housing. The improvement broadly comprises a shaft brake (27) adapted to be selectively engaged to prevent rotation of the shaft relative to the housing and adapted to be selectively disengaged to permit rotation of the shaft relative to the housing. This brake broadly includes a collar (22) mounted on the housing for combined axial and rotatable movement relative thereto; a first interlock portion (110) mounted on the shaft; an annular member (84) surrounding the shaft and mounted on the housing for axial but not rotative movement relative thereto, the member having a second interlock portion (85) arranged to face toward the first interlock portion; a spring (124) acting between the member and the shaft and urging the second interlock portion to move toward the first interlock portion; and wherein the collar is adapted to be selectively moved relative to the housing between a first position (as shown in FIG. 14) at which the first and second interlock portions are interlocked with one another to prevent rotation of the shaft relative to the housing, and a second position (as shown in FIG. 13) at which the first and second interlocked portions are physically separated from one another to permit the shaft to rotate relative to the housing. The device may be used separately, or in connection with any electrically-operated brake (37).

Modifications

The present invention expressly contemplates that many changes and modifications may be made. For example, the mechanical brake may be used in connection with an electrically-operated brake, or may be used separately. The shapes and configurations of the various parts and surfaces may be readily changed, as desired. The materials of construction are not deemed critical. Indeed, many of the details of the preferred embodiment disclosed herein are unique to that embodiment, and maybe it changed. Therefore, while the presently preferred form of the improved device has been shown and described, and several modification thereof discussed, persons skilled in this art will readily appreciate that various additional changes and modifications may be made without departing from the spirit of the invention, as defined and differentiated by the following claims.

What is claimed is:

1. In a device having a portion of a shaft mounted for rotation within a housing, the improvement which comprises:
   a shaft brake adapted to be selectively engaged to prevent rotation of said shaft relative to said housing and adapted to be selectively disengaged to permit rotation of said shaft relative to said housing, said brake including:
   a collar mounted on said housing by a helical connection for combined axial and rotative movement relative thereto;
   a first interlock portion mounted on said shaft; an annular member surrounding said shaft and mounted on said housing for axial but not rotative movement relative thereto, said member having a second interlock portion arranged to face toward said first interlock portion;
   a spring acting between said member and said shaft and urging said second interlock portion to move toward said first interlock portion; and
   wherein said collar is adapted to be selectively moved relative to said housing between a first position at which said first and second interlock portions are interlocked with one another to prevent rotation of said shaft relative to said housing, and a second position at which said first and second interlock portions are physically separated from one another to permit said shaft to rotate relative to said housing.

2. The improvement as set forth in claim 1 wherein said first and second interlock portions are face spline portions.

3. The improvement as set forth in claim 1 wherein said collar is adapted to be grasped and manually moved relative to said housing.

4. The improvement as set forth in claim 1 wherein said member is adapted to be mounted on said housing by one of a keyed and spline connection.

5. The improvement as set forth in claim 1 wherein said spring is one of a wave spring and a Belleville spring stack.

6. The improvement as set forth in claim 1 wherein said device also includes an electrically-operated brake adapted to selectively prevent relative rotation between said shaft and said housing.

7. The improvement as set forth in claim 6 wherein said housing has a first abutment surface and an opposed second abutment surface, and wherein said electrically-operated brake includes:
   a coil mounted on said housing;
   an armature mounted on said housing for movement toward and away from said housing first abutment surface;
   a resilient member acting between said housing and said armature and urging said armature to move away from said housing first abutment surface;
   an annular hub surrounding said shaft and mounted on said housing for axial but not rotative movement relative thereto; and
   an alternating series of friction pads and brake disks positioned between said armature and said housing second abutment surface, one of said pads and disks being fixed to said hub for movement therewith and the other of said pads and disks being connected to said housing such that when said coil is energized, said armature will be moved toward said housing first abutment surface to permit relative rotation between said shaft and housing, and when said coil is de-energized said resilient member will expand to cause said alternating series of friction pads and brake disks to be compressed between said armature and said housing second abutment surface.

8. The improvement as set forth in claim 7 wherein said shaft includes a first portion and a second portion.

9. The improvement as set forth in claim 8 wherein said first interlock portion is mounted on said shaft first portion.

10. The improvement as set forth in claim 8 wherein said hub surrounds said shaft second portion.

11. The improvement as set forth in claim 8 and further comprising a cam and follower acting between said first and second shaft portions to permit some relative rotation therebetween.

12. The improvement as set forth in claim 11 wherein when said, coil is de-energized, and said shaft portions move relative to one another, said follower moves along said cam to reduce the compressive force exerted by said resilient member on said alternating series of friction pads and disks.

13. The improvement as set forth in claim 12 wherein a marginal end portion of said first shaft is adapted to be manually rotated relative to said housing when said coil is de-energized.

14. The improvement as set forth in claim 11 wherein said resilient member will re-exert said compressive force when said shaft portions are moved back toward an initial null position therebetween.

* * * * *